(12) United States Patent
Brau et al.

(10) Patent No.: US 12,481,876 B2
(45) Date of Patent: *Nov. 25, 2025

(54) METHOD AND APPARATUS FOR EMPLOYING DEEP LEARNING TO INFER IMPLEMENTATION OF REGENERATIVE TILLAGE PRACTICES

(71) Applicant: CIBO Technologies, Inc., Cambridge, MA (US)

(72) Inventors: Ernesto Brau, Newton, MA (US); R. Shane Bussmann, Cambridge, MA (US); Ethan Sargent, Cambridge, MA (US)

(73) Assignee: CIBO Technologies, Inc., St. Louis Park, MN (US)

( * ) Notice: Subject to any disclaimer, the term of this patent is extended or adjusted under 35 U.S.C. 154(b) by 1211 days.

This patent is subject to a terminal disclaimer.

(21) Appl. No.: 17/334,983

(22) Filed: May 31, 2021

(65) Prior Publication Data

US 2022/0383099 A1 Dec. 1, 2022

(51) Int. Cl.
*G06N 3/08* (2023.01)
*G06F 16/51* (2019.01)
(Continued)

(52) U.S. Cl.
CPC .............. *G06N 3/08* (2013.01); *G06F 16/51* (2019.01); *G06N 3/045* (2023.01); *G06Q 10/06315* (2013.01); *G06Q 50/02* (2013.01)

(58) Field of Classification Search
CPC ........ G06N 3/045; G06N 3/0464; G06N 3/08; G06N 3/084; G06N 3/09; G06N 3/096;
(Continued)

(56) References Cited

U.S. PATENT DOCUMENTS 8,965,812 B2    2/2015 Linville
10,646,156 B1*  5/2020 Schnorr ................. G16H 30/40
(Continued)

OTHER PUBLICATIONS

Ishita Dasgupta et al., "AI Crop Predictor and Weed Detector Using Wireless Technologies: A Smart Application for Farmers," Oct. 16, 2020,Arabian Journal for Science and Engineering (2020) 45,pp. 11115-11127.*

(Continued)

*Primary Examiner* — Omar S Ismail
(74) *Attorney, Agent, or Firm* — Richard K. Huffman; Huffman Patent Group, LLC

(57) ABSTRACT

A computer-implemented method for predicting a cropland data layer (CDL) for a current year includes: retrieving a first set of records from a historical CDL database, where the first set corresponds to sampled areas of a region taken over a period for a number of years; retrieving a second set of records from a historical imagery database, where the second set corresponds to the sampled areas of the region, the period, and the number of years; employing the second set as inputs to train a deep learning network to generate the first set; retrieving a third set of records from a current imagery database, where the third set corresponds to a prescribed region, and where the third set corresponds to the time period and the current year; and using the third set as inputs and executing the trained deep learning network to generate a predicted CDL for the current year.

20 Claims, 6 Drawing Sheets

(51) Int. Cl.
*G06N 3/045* (2023.01)
*G06Q 10/0631* (2023.01)
*G06Q 50/02* (2024.01)

(58) Field of Classification Search
CPC ........ G06F 16/53; G06Q 10/04; G06Q 10/06; G06Q 50/02
See application file for complete search history.

(56) References Cited

U.S. PATENT DOCUMENTS

| | | | |
|---|---|---|---|
| 10,699,185 B2 | 6/2020 | Guan et al. | |
| 11,537,871 B2 | 12/2022 | Montantes | |
| 2003/0130767 A1 | 7/2003 | Carroll | |
| 2004/0264761 A1 | 12/2004 | Mas et al. | |
| 2005/0234691 A1 | 10/2005 | Singh et al. | |
| 2006/0213167 A1 | 9/2006 | Koselka et al. | |
| 2016/0215994 A1 | 7/2016 | Mewes et al. | |
| 2017/0270624 A1 | 9/2017 | Rooney | |
| 2018/0020622 A1 | 1/2018 | Richt | |
| 2018/0177136 A1 | 6/2018 | Reimann et al. | |
| 2019/0050948 A1* | 2/2019 | Perry | G06Q 30/02 |
| 2019/0057461 A1* | 2/2019 | Ruff | G01N 33/24 |
| 2019/0066234 A1 | 2/2019 | Bedoya et al. | |
| 2019/0108413 A1* | 4/2019 | Chen | G06V 10/82 |
| 2019/0222652 A1 | 7/2019 | Graefe et al. | |
| 2019/0228224 A1* | 7/2019 | Guo | G06V 10/454 |
| 2019/0304102 A1 | 10/2019 | Chen et al. | |
| 2020/0097851 A1* | 3/2020 | Alvarez | G06F 16/242 |
| 2020/0124581 A1 | 4/2020 | Gui et al. | |
| 2020/0125844 A1 | 4/2020 | She et al. | |
| 2020/0126232 A1* | 4/2020 | Guo | A01D 41/127 |
| 2020/0159220 A1 | 5/2020 | Hurd et al. | |
| 2020/0193589 A1* | 6/2020 | Peshlov | A01B 69/008 |
| 2020/0253127 A1* | 8/2020 | McCall | G06Q 50/02 |
| 2020/0334518 A1* | 10/2020 | Guan | G06Q 10/04 |
| 2021/0142559 A1* | 5/2021 | Yousefhussien | G06Q 10/06315 |
| 2021/0224967 A1* | 7/2021 | Stueve | A01G 25/16 |
| 2021/0286998 A1* | 9/2021 | Wilson | G06N 3/08 |
| 2022/0076068 A1 | 3/2022 | Wu et al. | |

OTHER PUBLICATIONS

Weijia Li et al.,"Deep convolutional neural network based large-scale oil palm tree detection for high-resolution remote sensing images," Dec. 4, 2017, 2017 IEEE International Geoscience and Remote Sensing Symposium (IGARSS),pp. 846-849.*

Luca Zelioli,"Environmental damage assessment based on satellite imagery using machine learning,"2020, Master of Science Thesis,Faculty of Science and Engineering,Åbo Akademi,2019,1800293, pp. 31-45, 47-76.*

Felix Quinton et al.,"Crop Rotation Modeling for Deep Learning-Based Parcel Classification from Satellite Time Series," Nov. 16, 2021,remote sensing,2021,13,4599,pp. 1-14.*

Wei Xia et al.,"Article High-Resolution Remote Sensing Imagery Classification of Imbalanced Data Using Multistage Sampling Method and Deep Neural Networks," Oct. 28, 2019, Remote Sens. 2019, 11, 2523,pp. 1-17.*

Tanha Talaviya et al.,"Implementation of artificial intelligence in agriculture for optimisation of irrigation and application of pesticides and herbicides," Apr. 22, 2020, Artificial Intelligence in Agriculture 4 (2020),pp. 60-65.*

Mazzia, Vittorio et al. "Improvement in Land Cover and Crop Classification Based on Temporal Features Learning From Sentinel-2 Data Using Recurrent-Convolutional Nerual Network (R-CNN)" Pixel R-CNN. May 5, 2020. pp. 1-21. arXiv:2004.12880v2 [cs.CV].*

Dasgupta, Ishita et al. "AI Crop Predictor and Weed Detector Using Wireless Technologies: A Smart Application for Farmers." Oct. 16, 2020, Arabian Journal for Science and Engineering (2020) 45, pp. 11115-11123. (Abstract Only Provided).

* cited by examiner

*USDA NATIONAL AGRICULTURAL STATISTICS CROPLAND DATA LAYER ACCESS*

DEEP CROPLAND DATA LAYER MODEL TRAINING FLOW

DEEP CROPLAND DATA LAYER MODEL EXECUTION FLOW

PREDICTED MANAGEMENT ZONES INFERENCES FLOW

METHOD AND APPARATUS FOR EMPLOYING DEEP LEARNING TO INFER IMPLEMENTATION OF REGENERATIVE TILLAGE PRACTICES

CROSS-REFERENCE TO RELATED APPLICATIONS

This application is related to the following co-pending U.S. Patent Applications, each of which has a common assignee and common inventors, the entireties of which are herein incorporated by reference.

| SER. NO. | FILING DATE | TITLE |
|---|---|---|
| 17/334,959 | —— | METHOD AND APPARATUS FOR EMPLOYING DEEP LEARNING NEURAL NETWORK TO PREDICT CROPLAND DATA LAYER |
| 17/334,970 | —— | METHOD AND APPARATUS FOR EMPLOYING DEEP LEARNING NEURAL NETWORK TO PREDICT MANAGEMENT ZONES |
| 17/334,974 | —— | METHOD AND APPARATUS FOR EMPLOYING DEEP LEARNING NEURAL NETWORK TO INFER REGENERATIVE COVER CROP PRACTICES |
| 17/334,978 | —— | METHOD AND APPARATUS FOR EMPLOYING DEEP LEARNING TO INFER IMPLEMENTATION OF REGENERATIVE IRRIGATION PRACTICES |

BACKGROUND OF THE INVENTION

Field of the Invention

This invention relates in general to the field of regenerative agricultural management practices, and more specifically to methods and systems for processing imagery data to predict crop-specific land cover, to determine agricultural management zones within fields, and to detect use of regenerative practices within agricultural management zones.

Description of the Related Art

Climate change is one of the most studied and discussed topics on the planet, and this level of global concern has sparked numerous initiatives to reduce Earth's carbon footprint. Initiatives include zero waste recycling and reuse programs, clean energy programs, conservation measures, sustainable transportation programs, and carbon offset and trading programs. This application focuses on carbon offsets from an agricultural perspective, how they are determined, and how programs to generate those offsets are monitored and verified.

As one skilled in the art will appreciate, billions of dollars are spent each year by countries, corporations, small businesses, and individuals to reduce greenhouse gas emissions. But more often than not, the impact of carbon footprint reduction programs is difficult to quantify, mainly because such an effort is labor intensive and relies heavily on self-reporting.

Every year the United States Department of Agriculture (USDA) generates a rasterized, geo-referenced, crop-specific land cover map for the continental United States that is known as the Cropland Data Layer (CDL). The CDL is generated from moderate resolution satellite imagery and extensive agricultural ground truth, and is used by all manner of agricultural-related entities such as universities and private research firms, commercial producers, growers, equipment manufacturers, underwriters, real-estate concerns, bankers, conservationists, carbon brokers, and political entities. The CDL consists of a raster of color-coded pixels, where each pixel comprises a 30 meter by 30 meter geographic area (0.09 hectare pixel resolution), and where each pixel's color is indicative of a particular type of "crop." The crops indicated range from conventional cash crops (e.g., corn, cotton, rice) and also include colors that indicate fallow/idle cropland, wetlands, ice/snow, developed land, forests, pastures, etc., thus mapping land in the continental United States to its use from an agricultural perspective.

Albeit extremely useful, generation of the CDL is not timely, for the CDL for a given year is not released to the public until the first quarter of the following year, which is quite limiting to those agricultural entities that require more timely data.

Accordingly, what is needed are methods and systems for predicting a cropland data layer at the end of a current year growing season.

What is also needed are methods and apparatus for predicting a cropland data layer at the end of a current year growing season based solely on satellite imagery data.

What is further needed are deep learning methods and systems that are trained on historical CDL data and corresponding satellite imagery data to predict CDL at the end of a current growing season.

What is additionally needed are methods and apparatus that employ transfer learning techniques to detect agricultural management practices zones within parcels based solely on satellite imagery.

What is finally need are methods and apparatus for inferring implementation and maintenance of agricultural management practices within determined management practices zones.

SUMMARY OF THE INVENTION

The present invention, among other applications, is directed to solving the above-noted problems and addresses other problems, disadvantages, and limitations of the prior art. In one embodiment, a computer-implemented method for determining agricultural tillage management practices for use within a current growing year is provided, the computer-implemented method including: retrieving a first set of records from a historical cropland data layer database, where the first set of records corresponds to randomly sampled areas of a first geographic region taken over a first time period for a first number of years; retrieving a second set of records from a historical imagery database, where the second set of records corresponds to the randomly sampled areas of the first geographic region, the first time period, and the first number of years; employing the second set of records as inputs to train a first deep learning convolutional neural network to generate the first set of records and using parameters generated during training to configure a trained first deep learning convolutional neural network for execution; configuring a second deep learning convolutional neural network using parameters corresponding to early layers of the trained first deep learning convolutional neural network; retrieving a third set of records and a fourth set of records from an annotated imagery database, where the third set of records includes unannotated image versions corresponding to a second geographic region, and where the fourth set of records includes annotated image versions corresponding to the second geographic region, and where the annotated image versions comprise annotations indicative of management zones, and where the third and fourth sets of records correspond to a second time period for a second number of years; employing the third set of records as inputs to train upper layers of the second deep learning convolutional neural network to generate the fourth set of records and using parameters generated during training to configure a trained second deep learning convolutional neural network for execution; retrieving a fifth set of records from a current imagery database, where the fifth set of records includes corresponds to a third geographic region, and where the fifth set of records corresponds to the second time period and the current growing year; using the fifth set of records as inputs and executing the trained second deep learning convolutional neural network to generate predicted agricultural management zones for the current growing year; and aggregating the fifth set of record into residue indices for parcels within the third geographic region, and processing the residue indices over the second time period for the current growing year to infer tillage practices for each of the predicted agricultural management zones as demarcated by boundaries of each of the parcels.

One aspect of the present invention comprehends a computer-readable storage medium storing instructions that, when executed by a computer, cause the computer to perform a method for determining agricultural tillage management practices for use within a current growing year, the method including: retrieving a first set of records from a historical cropland data layer database, where the first set of records corresponds to randomly sampled areas of a first geographic region taken over a first time period for a first number of years; retrieving a second set of records from a historical imagery database, where the second set of records corresponds to the randomly sampled areas of the first geographic region, the first time period, and the first number of years; employing the second set of records as inputs to train a first deep learning convolutional neural network to generate the first set of records and using parameters generated during training to configure a trained first deep learning convolutional neural network for execution; configuring a second deep learning convolutional neural network using parameters corresponding to early layers of the trained first deep learning convolutional neural network; retrieving a third set of records and a fourth set of records from an annotated imagery database, where the third set of records includes unannotated image versions corresponding to a second geographic region, and where the fourth set of records includes annotated image versions corresponding to the second geographic region, and where the annotated image versions comprise annotations indicative of management zones, and where the third and fourth sets of records correspond to a second time period for a second number of years; employing the third set of records as inputs to train upper layers of the second deep learning convolutional neural network to generate the fourth set of records and using parameters generated during training to configure a trained second deep learning convolutional neural network for execution; retrieving a fifth set of records from a current imagery database, where the fifth set of records includes corresponds to a third geographic region, and where the fifth set of records corresponds to the second time period and the current growing year; using the fifth set of records as inputs and executing the trained second deep learning convolutional neural network to generate predicted agricultural management zones for the current growing year; and aggregating the fifth set of record into residue indices for parcels within the third geographic region, and processing the residue indices over the second time period for the current growing year to infer tillage practices for each of the predicted agricultural management zones as demarcated by boundaries of each of the parcels.

Another aspect of the present invention envisages a computer program product for determining agricultural tillage management practices for use within a current growing year, the computer program product including: a computer readable non-transitory medium having computer readable program code stored thereon, the computer readable program code including: program instructions to retrieve a first set of records from a historical cropland data layer database, where the first set of records corresponds to randomly sampled areas of a first geographic region taken over a first time period for a first number of years; program instructions to retrieve a second set of records from a historical imagery database, where the second set of records corresponds to the randomly sampled areas of the first geographic region, the first time period, and the first number of years; program instructions to employ the second set of records as inputs to train a first deep learning convolutional neural network to generate the first set of records and to use parameters generated during training to configure a trained first deep learning convolutional neural network for execution; program instructions to configure a second deep learning convolutional neural network using parameters corresponding to early layers of the trained first deep learning convolutional neural network; program instructions to retrieve a third set of records and a fourth set of records from an annotated imagery database, where the third set of records includes unannotated image versions corresponding to a second geographic region, and where the fourth set of records includes annotated image versions corresponding to the second geographic region, and where the annotated image versions comprise annotations indicative of management zones, and where the third and fourth sets of records correspond to a second time period for a second number of years; program instructions to employ the third set of records as inputs to train upper layers of the second deep learning convolutional neural network to generate the fourth set of records and to use parameters generated during training to configure a trained second deep learning convolutional neural network for execution; program instructions to use the fifth set of records as inputs and to execute the trained second deep learning convolutional neural network to generate predicted agricultural management zones for the current growing year; and program instructions to aggregate the fifth set of record into residue indices for parcels within the third geographic region, and processing the residue indices over the second time period for the current growing year to infer tillage practices for each of the predicted agricultural management zones as demarcated by boundaries of each of the parcels.

BRIEF DESCRIPTION OF THE DRAWINGS

These and other objects, features, and advantages of the present invention will become better understood with regard to the following description, and accompanying drawings where.

DETAILED DESCRIPTION

Figure 1:
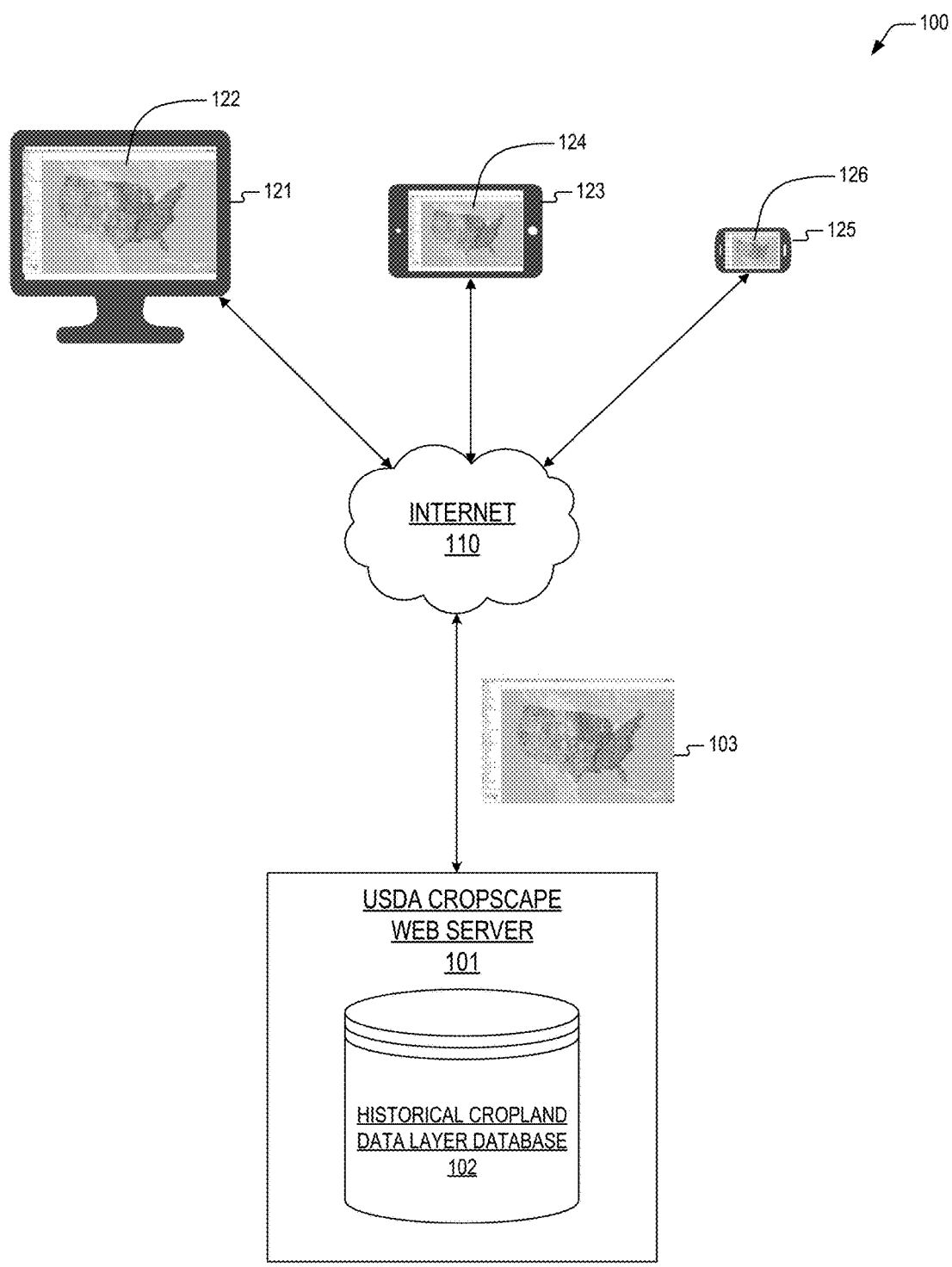
FIG. 1 is a block diagram illustrating how users presently access data from the USDA Cropland Data Layer database.

Exemplary and illustrative embodiments of the invention are described below. It should be understood at the outset that although exemplary embodiments are illustrated in the figures and described below, the principles of the present disclosure may be implemented using any number of techniques, whether currently known or not. In the interest of clarity, not all features of an actual implementation are described in this specification, for those skilled in the art will appreciate that in the development of any such actual embodiment, numerous implementation specific decisions are made to achieve specific goals, such as compliance with system-related and business-related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. Unless otherwise specifically noted, articles depicted in the drawings are not necessarily drawn to scale.

The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase. As used in this disclosure, "each" refers to each member of a set, each member of a subset, each member of a group, each member of a portion, each member of a part, etc.

Applicants note that unless the words "means for" or "step for" are explicitly used in a particular claim, it is not intended that any of the appended claims or claim elements are recited in such a manner as to invoke 35 U.S.C. § 112(f).

Definitions

Central Processing Unit (CPU): The electronic circuits (i.e., "hardware") that execute the instructions of a computer program (also known as a "computer application," "application," "application program," "app," "computer program," or "program") by performing operations on data, where the operations may include arithmetic operations, logical operations, or input/output operations. A CPU may also be referred to as a "processor."

Module: As used herein, the term "module" may refer to, be part of, or include an application specific integrated circuit (ASIC), an electronic circuit, a processor (shared, dedicated, or group) and/or memory (shared, dedicated, or group) that execute one or more computer programs, a combinational logic circuit, and/or other suitable components that provide the described functionality.

Microprocessor: An electronic device that functions as a CPU on a single integrated circuit. A microprocessor receives digital data as input, processes the data according to instructions fetched from a memory (either on-die or off-die), and generates results of operations prescribed by the instructions as output. A general-purpose microprocessor may be employed in a desktop, mobile, or tablet computer, and is employed for uses such as computation, text editing, multimedia display, and Internet browsing. A microprocessor may also be disposed in an embedded system to control a wide variety of devices including appliances, mobile telephones, smart phones, and industrial control devices.

Multi-Core Processor: Also known as a multi-core microprocessor, a multi-core processor is a microprocessor having multiple CPUs ("cores") fabricated on a single integrated circuit.

Instruction Set Architecture (ISA) or Instruction Set: A part of a computer architecture related to programming that includes data types, instructions, registers, addressing modes, memory architecture, interrupt and exception handling, and input/output. An ISA includes a specification of the set of opcodes (i.e., machine language instructions), and the native commands implemented by a particular CPU.

x86-Compatible Microprocessor: A microprocessor capable of executing computer applications that are programmed according to the x86 ISA.

Microcode: A term employed to refer to a plurality of micro instructions. A micro instruction (also referred to as a "native instruction") is an instruction at the level that a microprocessor sub-unit executes. Exemplary sub-units include integer units, floating point units, MMX units, and load/store units. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a sub-unit or sub-units within the CISC microprocessor.

Internet: The Internet is a global wide area network connecting computers throughout the world via a plurality of high-bandwidth data links which are collectively known as the Internet backbone. The Internet backbone may be coupled to Internet hubs that route data to other locations, such as web servers and Internet Service Providers (ISPs). The ISPs route data between individual computers and the Internet and may employ a variety of links to couple to the individual computers including, but not limited to, cable, DSL, fiber, and Wi-Fi to enable the individual computers to transmit and receive data over in the form of email, web page services, social media, etc. The Internet may also be referred to as the world-wide web or merely the web.

In view of the above background discussion on present-day techniques for generating crop statistics and presenting these statistics for public consumption, a discussion of the disadvantages and limitations of these techniques will be provided with reference to FIG. 1. Following this, a discussion of the present invention will be provided with reference to FIGS. 2-8. The present invention overcomes the problems associated with present-day crop statistics generation and distribution techniques by providing methods and systems for early and independent prediction of crop statistics such as cash crop and cover crop types, planting and harvesting dates, management zones within fields, and detection of regenerative management practices.

Referring to FIG. 1, a block diagram 100 is presented illustrating how users presently access data from the USDA Cropland Data Layer database. As one skilled in the art will appreciate, every year the United States Department of Agriculture (USDA) National Agricultural Statistics Service (NASS) produces the USDA Cropland Data Layer (CDL), which is a rasterized, geo-referenced, crop-specific land cover map for the continental United States. According to the USDA, CDL data is "created annually using moderate resolution satellite imagery and extensive agricultural ground truth." Boundary layers are provided that allow users to layover boundaries of counties, agricultural statistics districts (ASDs), states, regions, lakes and rivers, highways, and crop frequencies. CDLs date back to 1997 and the most current CDL is for 2020. Users are allowed to select geographic areas of interest, and view acreage statistics for a specific year or view the change from one year to another. Data from the CDL can be exported and may be used for research and analysis in a vast number of disciplines related to agricultural. Users include scientists, commercial producers, growers, equipment manufacturers, underwriters, real estate concerns, bankers, conservationists, carbon brokers, and political entities. The CDL consists of a raster of color-coded pixels, where each pixel comprises a 30 meter by 30 meter geographic area (0.09 hectare pixel resolution), and where each pixel's color is indicative of a particular type of "crop." The crops indicated range from conventional cash crops (e.g., corn, cotton, rice) and also include colors that indicate fallow/idle cropland, wetlands, ice/snow, developed land, forests, pastures, etc., thus mapping land in the continental United States to its use from an agricultural perspective. There are over 100 crops indicated. The CDL is hosted by the CropScape web server and is free for use by the public. Further information on the CDL may be found at the following USDA URL: https://data.nal.usda.gov/dataset/cropscape-cropland-data-layer.

Accordingly, the diagram 100 shows the USDA CropScape web server 101 that provides access to a historical cropland data layer database 102 that includes the above-noted CDL for the years 1997-2020. The present inventors note that the database 102 is referred to as "historical" because, as one skilled in the art will appreciate, the data provided in the CDL does not include the current year's data. That is, data for a previous year (e.g., 2020) is not published until late January or early February of the current year (e.g., 2021). The web server 101 is coupled to the internet 110, which allows users to search and access the CDL from a number of different devices that include, but are not limited to, desktop/laptop computers 121, tablet computers 123, and smartphones 125.

In operation, a user of one of the devices 121, 123, 125 may access the CropScape web server 101, and select from a number of parameters to download through the internet rasterized images 103 meeting criteria in accordance with input geographic area of interest along with the above-noted layering features. The rasterized images 103 are configured by the server 101 to comport with display capabilities of the user's devices 121, 123, 125. As is show in the diagram 100, a desktop/laptop CDL image 122 is displayed on the desktop/laptop computer 121, a tablet-sized CDL image 124 is displayed on the tablet computer 123, and a smartphone-sized CDL image 126 is displayed on the smartphone 125.

While exceedingly beneficial for many classes of users, the present inventors have observed that the present-day mechanisms for providing the CDL are limited, primarily because of the time lag that is required for the USDA NASS to generate and release the CDL for the previous year. Notwithstanding that previous year's CDLs are useful for many applications, there are a significant number of applications that require CDL data that is current. For instance, consider a carbon broker that has engaged a grower to implement certain regenerative management practices during the growing season. As one skilled in the art will appreciate, such regenerative practices include, but are not limited to, cover cropping, crop rotation, low/no irrigation, low/no tillage, composting, managed grazing, organic fertilization, etc. The grower commits to implement one or more of the regenerative management practices, the effects of which the carbon broker may quantify in terms of reduction of the grower's carbon footprint. This quantification is typically expressed in carbon credit units, which are then sold by the broker to individuals and businesses that are motivated to reduce greenhouse emissions. What is important to the carbon broker is to determine, monitor, and verify that the grower actually implemented the management practices that have been engaged. Incentive payments by the broker to the grower, whether pre-implementation or postimplementation, rest squarely upon independent determination, monitoring, and verification.

To monitor a single regenerative practices contract can be easily performed manually by dispatching representatives of the broker to the grower's fields to observe whether the practices were implemented or not, but such manual techniques cannot be economically scaled to address tens of thousands of contracts to corresponding growers. Accordingly, one aspect of scalable, automated regenerative practices implementation determination, monitoring, and verification requires CDL data that is current. More specifically, if a grower commits to implement, say, no tillage, then it is important to verify at the end of the growing season (typically) that the grower's fields have not been tilled.

The present inventors have also observed a pull in the art from the scientific and research community to obtain current predictions of CDL that are not subject to the latencies exhibited by government agencies. Accordingly, the present invention will now be discussed with reference to FIGS. 2-8.

Figure 2:
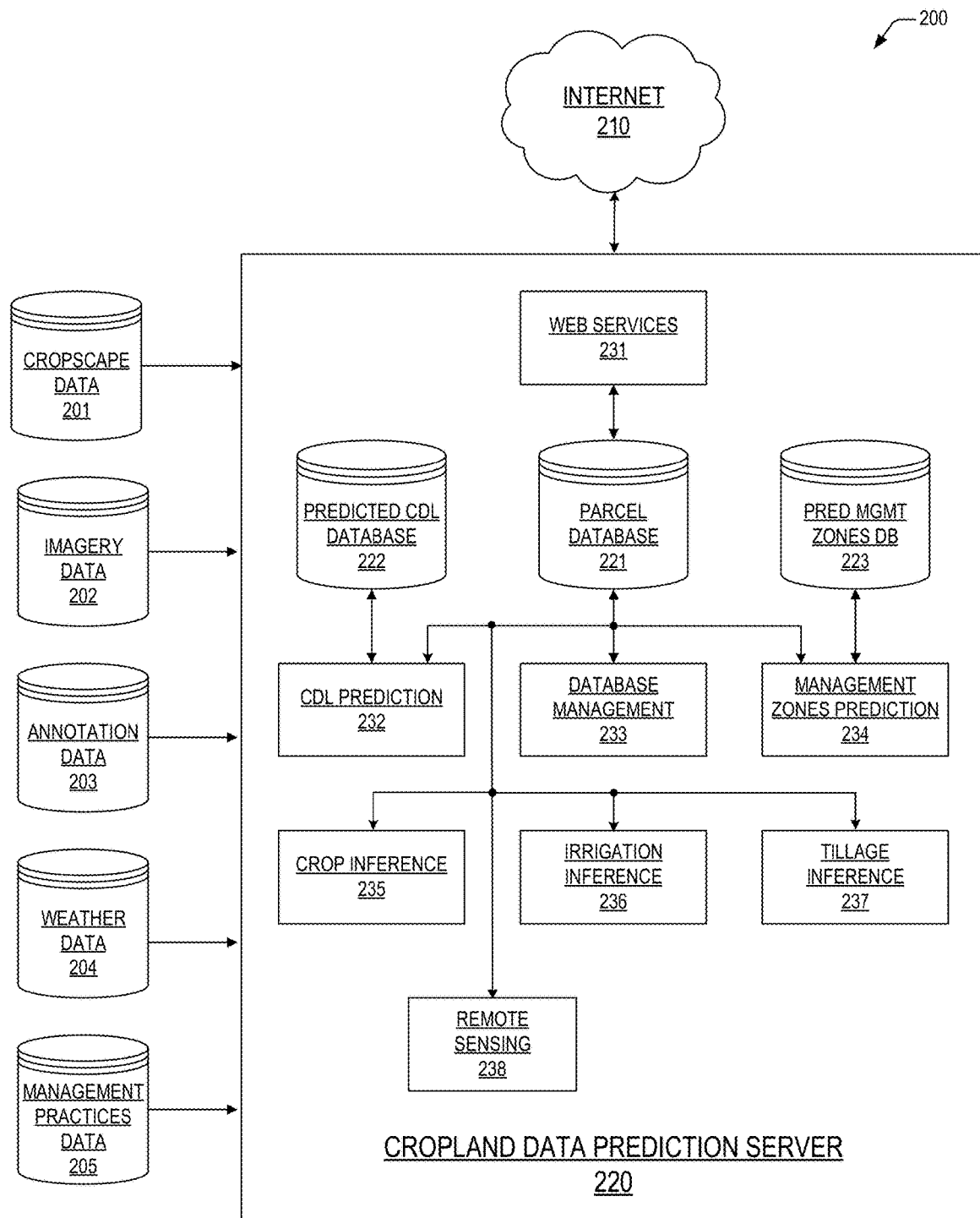
FIG. 2 is a block diagram depicting a cropland data prediction system according to the present invention.

Turning to FIG. 2, a block diagram is presented depicting a cropland data prediction system 200 according to the present invention. The cropland data prediction system 200 may include a cropland data prediction server 220 that is coupled to the internet 210. The server 220 is also coupled to the USDA CDL database 201 via the CropScape web server discussed above with reference to FIG. 1. The server 220 is also coupled to public and commercial databases 202-205 that include one or more imagery databases 202, one or more imagery annotation databases 203, one or more weather databases 204, and one or more agricultural management practices databases 205. Though shown in FIG. 2 as being directly coupled to the cropland data prediction server 220, preferably the databases 201-205 are accessed via the internet 210. Data accessed from the one or more imagery databases 202 may comprise aerial and satellite imagery of agricultural parcels in the United States consisting of optical, near infrared, and short-wave infrared bands that are employed to generated well known vegetative and tillage indices. Preferably, the satellite imagery data comprises Sentinel and/or Landsat imagery comprising the following bands used to generate Enhanced Normalized Vegetative Indices (eNVDIs) and Normalized Difference Tillage Indices (NTDIs): red channels, green channels, blue channels, near Infrared channels, cloud mask channels, and shortwave infrared channels. In one embodiment, these channels are obtained from Sentinel satellite overflights.

Data accessed from the one or more imagery annotation databases 203 may include both unlabeled ("unannotated") and manually labeled ("annotated") videos of different geographic areas, where each unannotated and corresponding annotated video comprises a plurality of images of a corresponding geographic area in the bands noted above that are taken over a period of time. The labeled videos are manually annotated by analysts trained to detect one or more distinct agricultural management zones within the corresponding geographic area. For example, pixels within the plurality of images may be labeled as either part of a management zone or not part of a management zone, as determined by the analysts. Management zones are visually distinguished by the analysts as exhibiting different agricultural management practices characteristics such as different crops, different growth rates and patterns, different planting and harvesting dates, etc. To provide coverage for the entire continental United States, the present invention contemplates videos covering approximately one percent of the total geographic area reasonably dispersed so as to account for regional differences. For example, to provide coverage for the corn belt (approximately ⅓ of the continental United States), roughly 20,000 annotated videos are required. Fewer annotated videos are required for coverage of the cotton belt, the wheat belt, and remaining growing regions.

Data from the one or more weather databases 204 may comprise historical weather records up to the present associated with geographic areas that include, but are not limited to, temperature, humidity, rainfall, snowfall, wind, and natural disasters (e.g., flood, tornados, etc.).

Data from the one or more management practices databases 205 may comprise grower-reported historical management practices as discussed above, and commitments to implementation of management practices for the current season. The data may additionally comprise grower management practices that are common to different geographical areas. The data may further comprise scenarios of "typical farming" on for fields in a given location. For example, given a field in central Illinois, the data may comprise indicators that farmers in this area typically plant a corn/soy rotation and maturity group for corn is typically 110 RM, which would be planted around May 15, and that farmers typically apply 150 pounds of nitrogen fertilizer in a split application: 100 pounds the day before planting, and 50 pounds as a mid-season side-dressing, and that the maturity group for soy is 3.8, which would be planted around May 2, requiring no fertilizer. The data may further provide indicators that most farmers in this area use conventional tillage, but 10% of them use conservation tillage.

The cropland data prediction server 220 may comprise a web services processor 231 that is coupled to a parcel database 221. The cropland data prediction server 220 may additionally comprise a cropland data layer (CDL) prediction processor 232, a database management processor 233, a management zones prediction processor 234, a crop inference processor 235, an irrigation inference processor 237, a tillage inference processor 237 and a remote sensing processor 238, all of which are coupled together, and which are coupled to the parcel database 221. The CDL prediction processor 232 is coupled to a predicted CDL database 222. The management zones prediction processor 234 is coupled to a predicted management zones database 223.

Operationally, the cropland data prediction server 220 is configured to provide current predictions of the USDA CDL for the continental United States at the end of the current year growing season, preferably in the month of October, though other embodiments are contemplated. Accordingly, predictions of the USDA CDL are generated roughly three to four months prior to release of the CDL by the USDA in the following year. As will be described in further detail below, the current predictions are based upon historical CDL data obtained from the CropScape database in conjunction with historical and current-year imagery data accessed from the one or more imagery databases 202. CDL predictions generated by the CDL prediction processor 232 are stored in the predicted CDL database 222.

The management zones prediction processor 234 is configured to provide current predictions of management zones within each geographical area in the continental United States. The management zones predictions are based upon parameters generated by the CDL prediction processor 232 and data provided by the one or more annotated imagery databases 203. Management zones predictions generated by the management zones predictions processor 234 are stored in the predicted management zones database 223.

The crop inference processor 235 is configured to generate inferences related to crops planted in the management zones that include, but are not limited to, primary ("cash")

crop type along with planting and harvesting dates. For fields comprising multiple management zones, differing crop types and dates may be inferred as indicative to regenerative management practices such as crop rotation and cover cropping. The crop inferences are based upon current imagery data from the one or more imagery databases 202, current predicted CDL data, current predicted management zones data, weather data from the one or more weather databases 204, and management practices data (if available) from the one or more management practices databases 205.

The irrigation inference processor 236 is configured to generate inferences related to irrigation practices within the management zones such as conventional irrigation, low irrigation, and no irrigation. The irrigation inferences are based upon current imagery data from the one or more imagery databases 202, current predicted CDL data, current predicted management zones data, weather data from the one or more weather databases 204, and management practices data (if available) from the one or more management practices databases 205.

The tillage inference processor 237 is configured to generate inferences related to tillage practices within the management zones such as conventional tillage, conservation tillage, and no tillage. The tillage inferences are based upon current imagery data from the one or more imagery databases 202, current predicted CDL data, current predicted management zones data, weather data from the one or more weather databases 204, and management practices data (if available) from the one or more management practices databases 205.

The remote sensing processor 238 is configured to access, cleanse, and format imagery data obtained from the one or more imagery databases 202 for use by the CDL prediction processor 232, the management zones prediction processor 234, the crop inference processor 235, and irrigation inference processor 236, and the tillage inference processor.

The database management processor 233 is configured to manage storage of CDL predictions, management zones predictions, crop inferences, irrigation inferences, and tillage inferences in the parcel database 221 and to correlate and associate those predictions and inferences with specific fields and owners in the continental United States. As is noted above, boundary layer options provided by the UDSA Cropland Data Layer are county, agricultural statistics districts, state, and region. Advantageously, the parcel database 221 comprises public records for all agricultural parcels in the continental United States that allow for an additional parcel-level ("field-level") boundary layover of predicted CDL. Advantageously, CDL and management zones predictions generated by the server 220 based on satellite imagery may be used to identify crops at the field level. In addition, the crop, irrigation, and tillage inferences may be applied at the field level as well, and may be thus employed to determine, monitor, and verify grower's implementation of regenerative management practices.

The web services processor 231 is configured to accepts queries from users via the internet 210 and to format and transmit results of those queries from the parcel database 221.

The cropland data prediction server 220 according to the present invention is configured to perform the functions and operations as discussed above. The server 220 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the server 220 may be shared with other circuits, microcode, etc., that are employed to perform other functions and/or operations within the server 220. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

Figure 3:
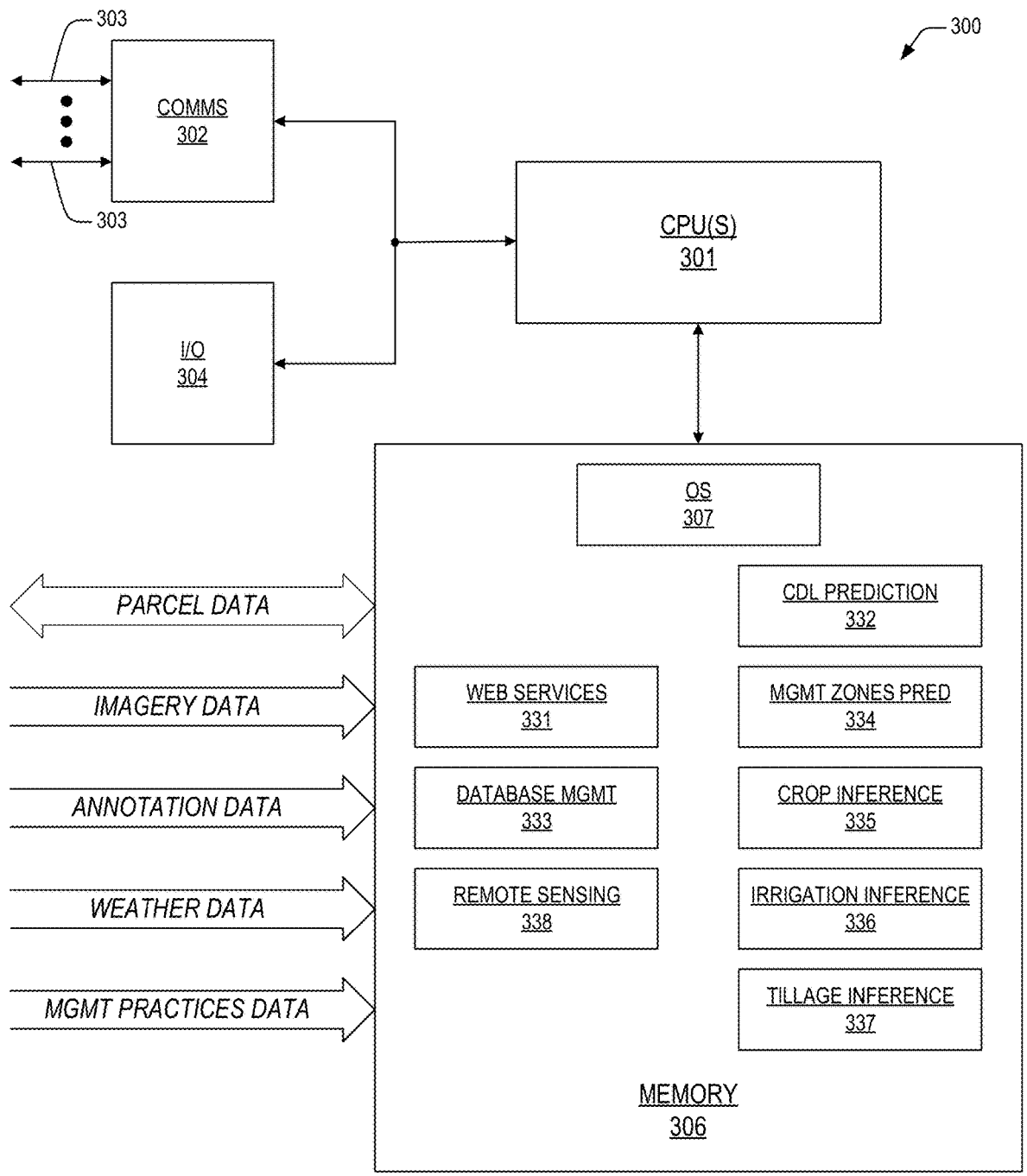
FIG. 3 is a block diagram featuring a cropland data prediction server according to the present invention, such as may be employed within the system of FIG. 2.

The server 220 according to the present invention may additionally comprise one or more application programs executing thereon to perform the operations and functions described above, and which will be disclosed in further detail with reference to FIG. 3.

Now referring to FIG. 3, a block diagram is presented featuring a cropland data prediction server 300 according to the present invention, such as may be employed within the system 200 of FIG. 2. The server 300 may include one or more central processing units (CPU) 301 that are coupled to memory 306 having both transitory and non-transitory memory components therein. The CPU 301 is also coupled to a communications circuit COMMS 302 that couples the SERVER 300 to the internet 210 via one or more wired and/or wireless links 303. The links 303 may include, but are not limited to, Ethernet, cable, fiber optic, and digital subscriber line (DSL). As part of the network path to and through the internet 210, internet service providers (ISPs) may employ wireless technologies from point to point as well.

The server 300 may also comprise input/output I/O circuits 304 that include, but are not limited to, data entry and display devices (e.g., keyboards, monitors, touchpads, etc.). The memory 306 may be coupled to a parcel database 221 and to the databases 201-205 described with reference to FIG. 2 above. Though the cropland data prediction server 200 of FIG. 2 is shown directly coupled to databases 201-205, the present inventors note that interfaces to these data sources may exclusively be through the communications circuit 302 or may be through a combination of direct interface and through the communications circuit 302, according to the source of data. In addition, Though the cropland data prediction server 200 of FIG. 2 is shown to additionally include the predicted CDL database 222 and the predicted management zones database 223, interfaces to these data stores may exclusively be accomplished through the communications circuit 302 or may be through a combination of direct interface and through the communications circuit 302, according to the type of data stores.

The memory 306 may include an operating system 307 such as, but not limited to, Microsoft Windows, Mac OS, Unix, and Linux, where the operating system 307 is configured to manage execution by the CPU 1001 of program instructions that are components of one or more application programs. In one embodiment, a single application program comprises a plurality of code segments 331-338 resident in the memory 306 and which are identified as a web services code segment 331, a CDL prediction code segment 332, a database management code segment 333, a management zones prediction code segment 334, a crop inference code segment 335, an irrigation inference code segment 336, a tillage inference code segment 337 and a remote sensing code segment 338.

Operationally, the cropland data prediction server 300 may execute one or more of the code segments 331-337 under control of the OS 307 as required to enable the server 300 to ingest data from external data sources 201-205 and to employ the data from the sources 201-205 to predict the cropland data layer at the end of a growing season, typically in October of the same year, to determine agricultural management zones within the predicted cropland data layer, and to infer implementation and maintenance of regenerative agricultural management practices corresponding to one or more parcels having corresponding identification data that is stored in the parcel database 221. One or more of the code segments 331-337 may be executed to update the predicted CDL database 222, the parcel database 221, and the predicted management zones database 223, with corresponding results generated by the CDL prediction code segment 332, the management zones prediction code segment 334, the crop inference code segment 335, the irrigation inference code segment 336, and the tillage inference code segment 337. The web services code segment 231 many execute to access data requested by users via COMMS 302 from the parcel database 221, and may format and transmit results of user's queries via COMMS 302 over one or more of the links 303. One embodiment of the present invention contemplates data stored in the parcel database 221 for approximately 20 million agricultural parcels within the continental United States, where the data may be rapidly and easily searched and accessed.

The database management code segment 333 may be executed to store data to or retrieve data from the parcel database 221 resulting from CDL predictions made by the CDL prediction code segment 332, management zone predictions made by the management zones prediction code segment 334, crop inferences made by the crop inference code segment 335, irrigation inferences made by the irrigation inference code segment 336, and tillage inferences made by the tillage inference code segment 337. The database management code segment 333 may further execute to assist the web services code segment 331 in providing query results from the parcel database 221 to users via COMMS 302. The database management code segment 333 may additionally execute to provide storage within the parcel database 221 of imagery data as described above that is associated with one or more parcels. The database management code segment 333 may also execute to provide storage within the parcel database 221 of annotated imagery data as described above that is associated with one or more parcels. The database management code segment 333 may further execute to provide storage within the parcel database 221 of weather data and management practices data as described above that is associated with one or more parcels.

The CDL prediction code segment 332 may execute to perform the functions described above to generate predicted cropland data layers for the continental United States at the end of a current year growing season, in one embodiment, where predictions made by the CDL prediction code segment 332 are based, as will be described in further detail below, on historical USDA CDL data, geographically corresponding imagery data, and imagery data from the current year growing season. In another embodiment, the CDL prediction code segment 332 may execute to perform the functions described above to generate predicted cropland data layers for the continental United States during a current year growing season.

The management zones prediction code segment 334 may execute to perform the functions described above to generate predicted management zones for the continental United States at the end of a current year growing season, in one embodiment, where predictions made by the management zones prediction code segment 334 are based, as will be described in further detail below, on early level deep learning model parameters provided by the CDL prediction code segment 332, annotated imagery data, and imagery data from the current year growing season. In another embodiment, the management zones prediction code segment 334 may execute to perform the functions described above to generate predicted management zones within the predicted cropland data layers generated by the CDL prediction code segment 332 for the continental United States during a current year growing season.

The crop inference code segment 335 may execute to perform the functions described above to generate inferences for parcels stored within the parcel database 221 and management zones within those parcels (as determined by the management zones prediction code segment 334) that include, but are not limited to, primary crop type, planting dates, and harvesting dates; secondary crop type, planting dates, and harvesting dates; and like inferences for additional management zones (if identified) within the parcels. The crop inference code segment 335 may utilize, if available, management practices provided by growers or other ground truth sources, CDL predictions, management zones predictions, weather data, and current imagery data to generate the above noted inferences.

The irrigation inference code segment 336 may execute to perform the functions described above to generate inferences for parcels stored within the parcel database 221 and management zones within those parcels (as determined by the management zones prediction code segment 334) that include, but are not limited to, irrigation practices (conventional irrigation, low irrigation, no irrigation) along with irrigation dates. The irrigation inference code segment 336 may utilize, if available, management practices provided by growers or other ground truth sources, CDL predictions, management zones predictions, weather data, and current imagery data to generate the above noted inferences.

The tillage inference code segment 336 may execute to perform the functions described above to generate inferences for parcels stored within the parcel database 221 and management zones within those parcels (as determined by the management zones prediction code segment 334) that include, but are not limited to, tillage practices (conventional tillage, conservation tillage, no tillage) along with tillage dates. The tillage inference code segment 336 may utilize, if available, management practices provided by growers or other ground truth sources, CDL predictions, management zones predictions, weather data, and current imagery data to generate the above noted inferences.

The remote sensing code segment 338 may execute to perform the functions described above to retrieve historical and current imagery data, to cleanse the imagery data prior to employment by code segments 332-337, and to format the imagery data for employment by code segments 332-337.

Figure 4:
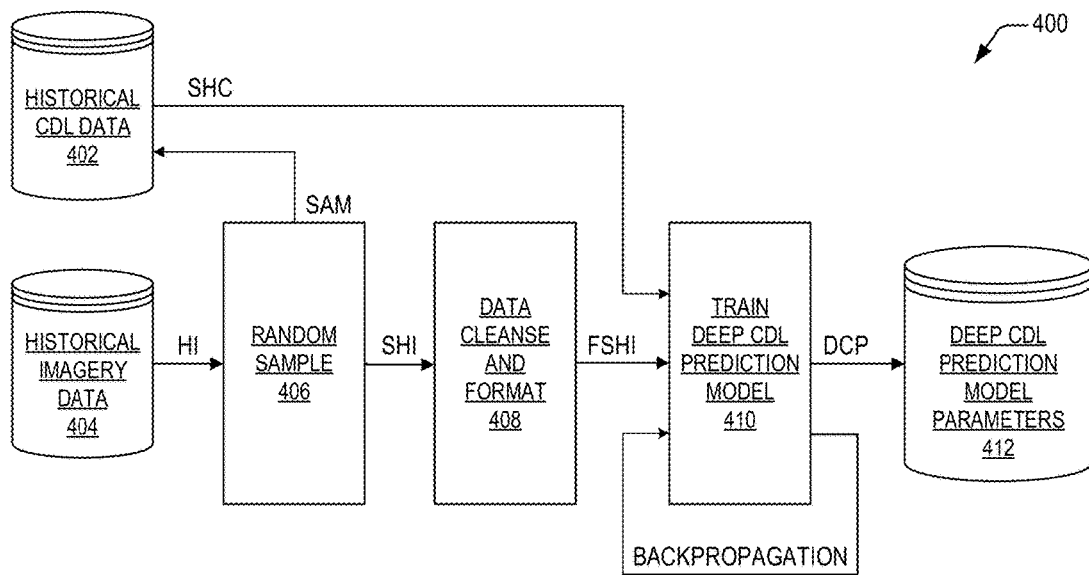
FIG. 4 is a flow diagram showing a method according to the present invention for training a deep cropland data layer model, such as may be performed by the system of FIG. 2.

Now turning to FIG. 4, a flow diagram 400 is presented showing a method according to the present invention for training a deep cropland data layer model, such as may be performed by the system 200 of FIG. 2. The deep cropland data layer model is generated by the CDL prediction processor 232 and is employed by the CDL prediction processor 232 to generate a predicted cropland data layer at the end of a current year growing season, prior to when the USDA releases the CropScape CDL data. In one embodiment, the deep cropland data layer model is a deep learning convolutional neural network comprising 5 layers that is trained using historical imagery data to predict corresponding historical CDL. Once trained, the deep cropland data layer model may be executed using parameters derived from the training along with current year imagery data to generate predicted CDL for the continental United States. In one embodiment, the deep cropland data layer model employs 128×128 pixel historical imagery tiles, where each pixel corresponds to 10-meter ground resolution for Sentinel images. The present inventors note that the 128×128 pixel historical imagery tiles may, in some cases, be confused with Sentinel the granules, also called "tiles," which are 100 km×100 km in size; however, the clarity purposes, "tiles" will be employed herein to connote 128×128 pixel images. In one embodiment, each tile comprises five optical and infrared bands (i.e., red, green, blue, near infrared, and cloud mask). Another embodiment contemplates six optical, infrared, and short-wave infrared bands (i.e., red, green, blue, near infrared, short-wave infrared, and cloud mask). In one embodiment, two tiles are generated per month, equally spaced in time, for the months of May through October, thus providing 12 tiles per year for both training and execution. Accordingly, each tile comprises a 1,280 meter by 1,280 meter geographic region and these tiles are used as training inputs, as will be described below, for generation of a corresponding geographic area of historical CDL. As is noted above, since CDL has 30 meter ground resolution, pixels of the CDL are replicated times 3 to comport with the Sentinel imagery tiles. Thus, twelve 128×128 satellite imagery tiles for a given year are used as inputs to train the deep cropland data layer model to predict corresponding formatted 128×128 CDL tiles for the same year. In one embodiment, the previous three years of CDL and imagery data are used to train the model.

In one embodiment, in a random sample step 406, random geographic area samples of historical satellite imagery data are accessed from the historical imagery database 404 via bus HI and random sample locations are provided to the historical CDL database 402 via bus SAM for retrieval of historical CDL that corresponds (in both growing year and geographic location) to the random geographic area samples of the historical satellite imagery data. Corresponding historical CDL samples are provided via bus SHC. Random sampling is employed to train the model because it is trained against ground truth data (i.e., USDA CDL). Historical satellite imagery sample tiles are provided via bus SHI to block 408 where the tiles are cleansed and formatted. Cleansing and formatting may comprise removal of duplicate information, inferring missing values, substituting for unconventional characters and symbols, removal of outlier values, and inference of missing values. Cleansed and formatted historical satellite imagery tiles are provide via bus FSHI along with corresponding historical CDL sample tiles via bus SHC to the step 410, where parameters (e.g., weights) of the deep CDL prediction model are iteratively trained. In one embodiment 180,000 geographic area samples of historical satellite imagery and corresponding historical CDL are employed, where each of three years comprises 60,000 sample tiles. In one embodiment, 40,000 of the 60,000 tiles in each year are employed as training data and the remaining 20,000 tiles are employed as a validation set to evaluate model accuracy and performance. The historical satellite imagery and corresponding CDL tiles are provided to the deep CDL model in random order. Backward propagation of errors (also known as backpropagation) is employed to train the convolutional deep learning network. As one skilled in the art will appreciate, backpropagation is technique for feedback of total loss into a deep learning convolutional neural network to determine how much of the loss every node is responsible for, and for subsequently updating model weights in a manner that minimizes the loss by giving the nodes with higher error rates lower weights and vice versa. Once the deep learning CDL prediction model is trained at step 410, parameters for the 12-layer deep learning model are provided via bus DCP and stored in a deep CDL prediction model database 412. The present invention contemplates retraining the deep learning CDL prediction model every year using newly released USDA CDL and corresponding newly acquired satellite imagery, thus improving the accuracy of predicted CDL. The present inventors note that the deep CDL prediction model according to the present invention is trained to predict CDL, which is indicative of land cover type.

Figure 5:
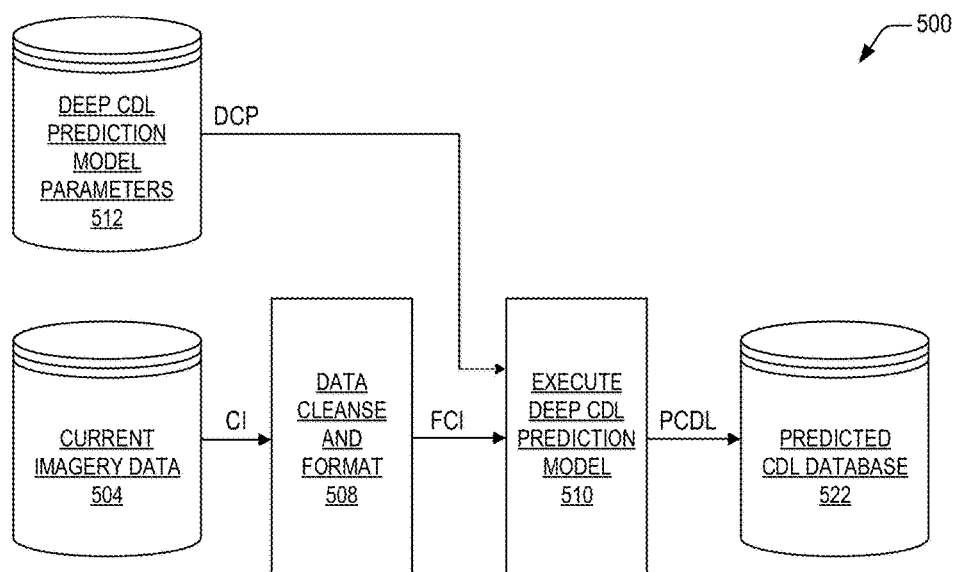
FIG. 5 is a flow diagram illustrating a method according to the present invention for executing a deep cropland data layer model, such as may be performed by the system of FIG. 2.

Referring now to FIG. 5, a flow diagram 500 is presented illustrating a method according to the present invention for executing a deep cropland data layer model, such as may be performed by the system 200 of FIG. 2. Once trained in accordance with the steps discussed above with reference to FIG. 4, the deep CDL prediction model is configured using the model parameters derived during training. These model parameters are provided from database 512 on bus DCP.

Current year imagery data for the growing season is accessed from database 504 on bus CI and is cleansed and formatted in step 508 in the same manner as is discussed above with reference to step 408 of FIG. 4. Preferably, the current year imagery data is of the same format (128×128) as used for training and comprises 12 tiles that are distributed approximately even in time over a 6-month growing season from May through October. While the deep CDL prediction model is trained to predict CDL for the entire continental United States, the present inventors note that selected geographical areas may be addressed through execution of the model, where the areas are demarcated by the imagery data that is provided via bus FCI.

The deep CDL prediction model is sequentially executed at step 510 to generate predicted CDL that corresponds to each of the image sequences provided via bus FCI. The predicted CDL, as demarcated by the outer geographic boundaries of the image sequences, is provided via bus PCDL and is stored in database 522. It is noted that geographic range of predicted CDL that is generated by the deep CDL prediction model at step 510 is a function of the geographic range of current imagery data provided to the model via bus FCI. For example, a user may be interested in CDL for a state (e.g., Kentucky) or a growing region (e.g., the corn belt). Accordingly, only current imagery covering the desired geographic area is retrieved from database 504. The predicted CDL is a USDA CDL-equivalent raster in both pixel resolution and color coding. Since imagery tiles and corresponding predicted CDL are only associated with longitude and latitude, the present invention contemplates stitching adjacent CDL tiles together using coordinates of farms and parcels as stored in the parcel database 221 to provide for a field-level layover of CDL. This aggregation of CDL predictions at the field level is performed by the database management processor 233.

Figure 6:
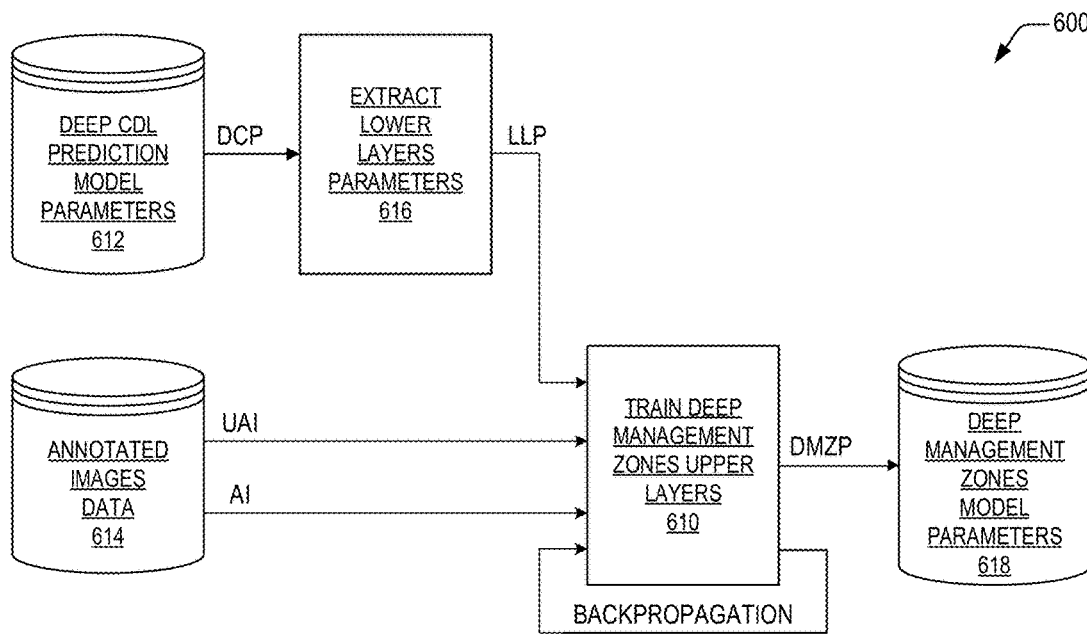
FIG. 6 is a flow diagram detailing a method according to the present invention for training a deep management zones model, such as may be performed by the system of FIG. 2.

Turning now to FIG. 6, a flow diagram 600 is presented detailing a method according to the present invention for training a deep management zones prediction model, such as may be performed by the system 200 of FIG. 2. The deep management zones model is employed to determine one or more management zones within 128×128 pixel imagery tiles based solely on the imagery itself. As noted above management zones are anything that a trained analyst would visually observe from a time sequence of imagery tiles as exhibiting different agricultural management practices than other portions of the imagery tiles. Such observable management practices include, but are not limited to, crop type, specific cultivar or crop variety, planting and harvesting data, planting density (e.g., row spacing), tillage types and dates, fertilizer application, crop rotation and cover cropping, irrigation (e.g., dates and amounts), buffer zoning, and drainage control. The analysts may not specifically know which management practice is being applied; what is known is that image pixels within an area demarcated by a polygon within an image tile utilizes a different management practice than other areas demarcated by other polygons within the image tile. Preferably, pixels within the 128×128 imagery tiles are labeled to indicate one or more polygons within the image as management zones. Geographic areas (1,280 meters×1,280 meters) corresponding to individual imagery tiles may comprise one or more management zones.

The present inventors have observed that detection of agricultural management zones from imagery data is very similar to early layer feature determination that is employed by the deep CDL prediction model from imagery data, thus providing an excellent case for so-called transfer learning. Accordingly, the deep management zones prediction model according to the present invention, like the deep learning CDL predication model discussed above with reference to FIGS. 4-5, is a deep learning convolutional neural network comprising 5 layers, in one embodiment, that is trained using historical unlabeled and labeled imagery data to predict one or more management zones within a time sequence of imagery tiles. Preferably, parameters corresponding to the early layers of the deep CDL prediction model are replicated to configure the deep learning management zones prediction model, and the remaining 4 layers are trained on the historical unlabeled and labeled imagery data to classify learned features into management zones. One aspect of the deep learning management zones prediction model comprises determining polygons within a sequence of image tiles where adjacent pixels in the annotated imagery data are labeled as being part of a management zone.

Once trained, the deep management zones prediction model may be executed using parameters derived from the training along with current year imagery data to generate predicted management zones for any parcel in the continental United States. Since imagery tiles and corresponding predicted management zones are only associated with longitude and latitude, the present invention contemplates stitching adjacent management zones tiles together using coordinates of farms and parcels as stored in the parcel database 221 to provide for a field-level layover of management zones. This aggregation of management zone predictions at the field level is performed by the database management processor 233.

Like the deep CDL prediction model, the deep management zones prediction model employs 128×128 pixel historical imagery tiles, where each pixel corresponds to 10-meter ground resolution for Sentinel images. Both labeled and unlabeled versions of each tile are employed for training. Each tile comprises the five above noted optical and infrared bands (i.e., red, green, blue, near infrared, and cloud mask) that are aggregated into an enhanced vegetative index as described above. Preferably, ten tiles are generated per month, equally spaced in time, for the months of May through October, thus providing 60 tiles per year for both training and execution. Other numbers of tiles per year are contemplated. Accordingly, each labeled and unlabeled tile comprises a 1,280 meter by 1,280 meter geographic region and these tiles are used as training inputs, as will be described below, for predictions of management zones that match the labeled imagery tiles. In one embodiment, the previous 2 years of labeled and unlabeled imagery data are used to train the model.

Operationally, step 616 accesses the deep CDL prediction model parameters determined in the flow of FIG. 4 from database 612 and, preferably, the early feature determination layer parameters are extracted and applied to configure the early layers of the deep management zones prediction model.

Database 614 provides unannotated and corresponding annotated image sequences randomly to train the upper layers ("later layers") of the model at block 610. Backward propagation of is employed to train the convolutional deep learning network via bus BACKPROPAGATION. Once the deep management zones prediction model is trained at step 610, parameters for the 12-layer deep learning model are provided via bus DMZP and stored in a deep management zones prediction model database 618. The present invention contemplates retraining the deep management zones prediction model as management practices are modified or added.

Figure 7:
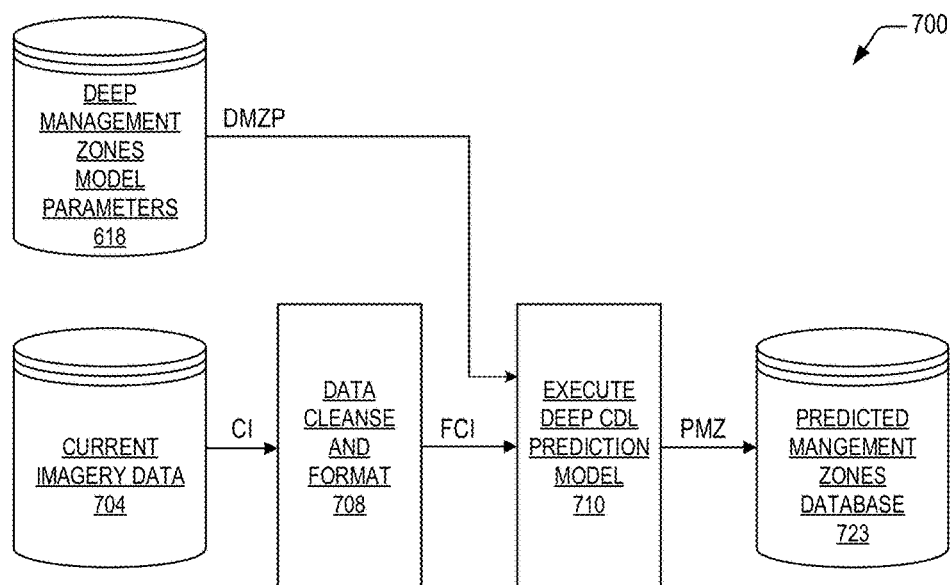
FIG. 7 is a flow diagram depicting a method according to the present invention for executing a deep management zones model, such as may be performed by the system of FIG. 2.

Referring to FIG. 7, a flow diagram 700 is presented depicting a method according to the present invention for executing a deep management zones model, such as may be performed by the system 200 of FIG. 2. Once trained in accordance with the steps discussed above with reference to FIG. 6, the deep management zones prediction model is configured using the model parameters derived during training. These model parameters are provided from database 618 on bus DMZP. Current year imagery data for the growing season is accessed from database 704 on bus CI and is cleansed and formatted in step 708 in the same manner as is discussed above with reference to step 408 of FIG. 4. Preferably, the current year imagery data is of the same format (128×128) as used for training and comprises 60 tiles that are distributed approximately even in time over a 6-month growing season from May through October. Other numbers of tiles are contemplated to comport with the same number of tiles used for training as discussed with reference to FIG. 6. For example, if a sequence of 12 labeled and unlabeled tiles per growing season are used to train the deep management zones prediction model, then 12 tiles of current imagery data are employed for execution. While the deep management zones prediction model is trained to predict management zones for the entire continental United States, the present inventors note that selected geographical areas may be addressed through execution of the model, where the areas are demarcated by the imagery data that is provided via bus FCI.

The deep management zones prediction model is sequentially executed at step 710 to generate predicted management zones that correspond to each of the image sequences provided via bus FCI. The predicted management zones, as demarcated by polygons within the image sequences, is provided via bus PMZ and is stored in database 723.

It is noted that geographic range of predicted management zones that is generated by the deep management zones prediction model at step 710 is a function of the geographic range of current imagery data provided to the model via bus FCI. For example, a user may be interested in management zones for a state (e.g., Kentucky) or a growing region (e.g., the corn belt). Accordingly, only current imagery covering the desired geographic area is retrieved from database 704.

Since imagery tiles and corresponding predicted management zones are only associated with longitude and latitude, the present invention contemplates stitching adjacent management zones tiles together using coordinates of farms and parcels as stored in the parcel database 221 to provide for a field-level layover of management zones, thus providing detail about management practices employed on individual farms. This aggregation of management zones predictions at the field level is performed by the database management processor 233.

The present inventors note that virtually any agricultural management practice could conceivably be determined using parameters of early layers of the deep CDL prediction model in transfer learning cases, if sufficient ground truth data existed. Indeed, it is noted that the present invention comprehends transfer learning techniques as discussed above to configure models for detection of crop rotation, cover cropping, irrigation, and tillage practices based solely on processing of current satellite imagery data by models trained to detect these practices using sufficient ground truth data. However, presently there is insufficient commercially available ground truth data to determine these practices via application of transfer learning to deep neural networks. Accordingly, the present invention also contemplates inferences of these practices using statistical inference techniques, as will now be discussed with reference to FIG. 8.

Figure 8:
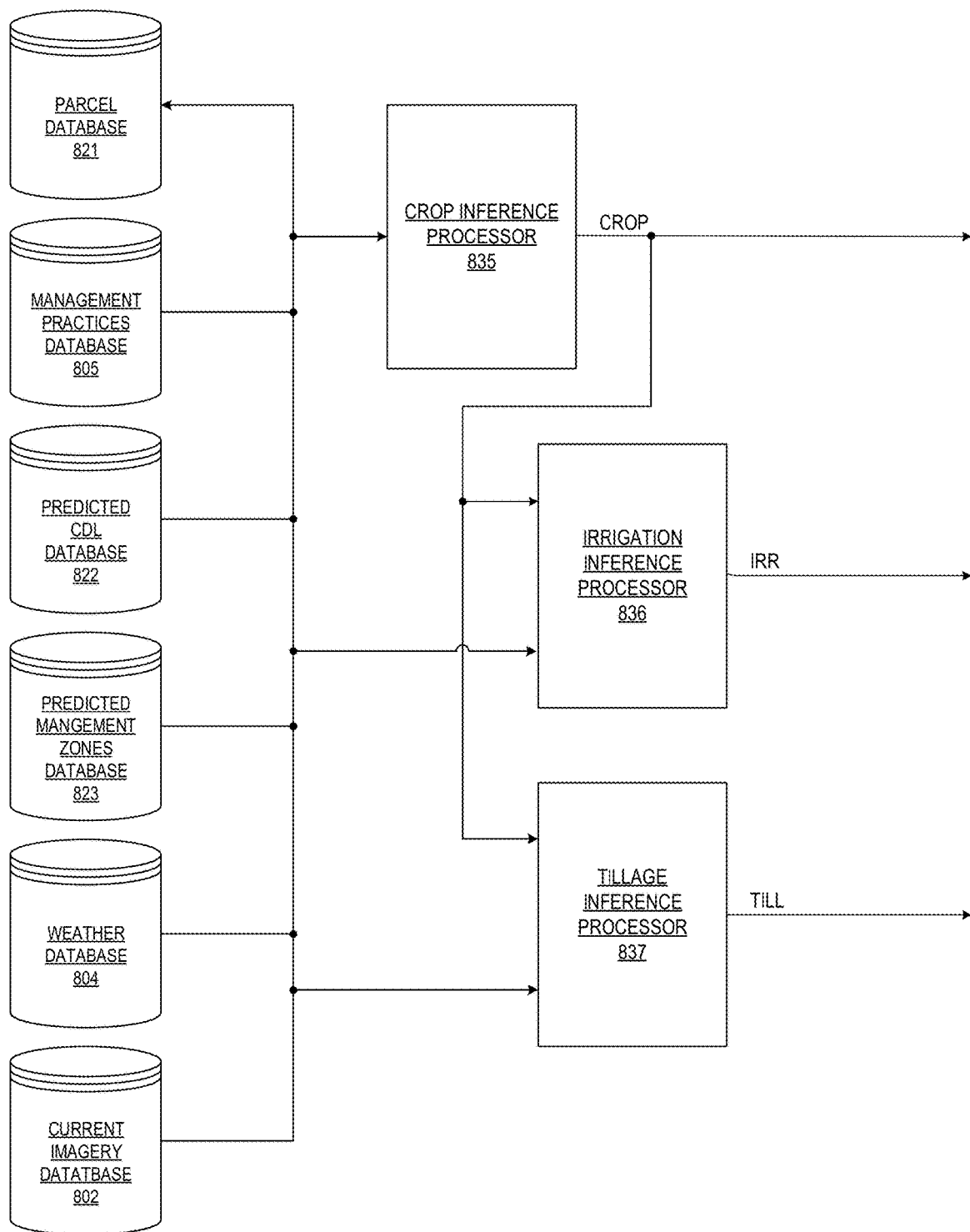
FIG. 8 is a flow diagram featuring a method according to the present invention for inferring implementation of agricultural management practices within parcel management zones.

Finally turning to FIG. 8, a flow diagram 800 is presented featuring a method according to the present invention for inferring implementation of agricultural management practices within parcel management zones. Using data from a parcel database 821, management practices database 805, predicted CDL database 822, predicted management zones database 823, weather database 804, and current imagery database 802, a crop inference processor 835 aggregates current imagery data into enhanced vegetative indices for given parcels and processes the aggregated enhanced vegetative index (EVI) data against EVI maturity curves provided by the management practices database 805 to determine crop type, planting date, harvest date, and maturity. The crop inference processor 835 is configured to infer what crop is growing in a particular management zone within a particular field, and when that crop emerged from the ground. This is done by monitoring the vegetative index over time. Different crops have different vegetative index curves, so by observing the increases in EVI over time, the crop inference processor 835 can infer what crop is growing and when the crop was planted. Results of these inferences are stored along with other field and management zone data in the parcel database 821 and are provided on bus CROP. Though EVI is preferably employed, the present invention also contemplates use of Normalized Difference Vegetative Index (NDVI) images.

Using data from a parcel database 821, management practices database 805, predicted CDL database 822, predicted management zones database 823, weather database 804, and current imagery database 802, an irrigation inference processor 836 aggregates current imagery data into vegetative indices for given parcels and processes the vegetative index data against maturity curves along with rainfall data obtained from the weather database 804, and to thus to infer the type of irrigation practices (i.e., conventional irrigation, low irrigation, no irrigation) applied to each management zone. Results of these inferences are stored along with other field and management zone data in the parcel database 821 and are provided on bus IRR.

Using data from a parcel database 821, management practices database 805, predicted CDL database 822, predicted management zones database 823, weather database 804, and current imagery database 802, a tillage inference processor 837 distinguishes different tillage types as a function of the amount of residue present on a management zone within a field for, as one skilled in the art will appreciate, different amounts of residue present on the field result in different near-IR signatures. Accordingly, the tillage inference processor 837 may employ one or more residue indices such as, but not limited to, Normalized Difference Tillage Index (NDTI), Shortwave Infrared Normalized Difference Residue Index (SINDRI), and Cellulose Absorption Index (CAI) to distinguish tillage practices (i.e., conventional tillage, conservation tillage, no tillage) in a manner substantially similar to the employment of EVI and other spectral indices to determine crop type and maturity. Results of these inferences are stored along with other field and management zone data in the parcel database 821 and are provided on bus TILL.

Portions of the present invention and corresponding detailed description are presented in terms of software or algorithms, and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims. For example, components/elements of the systems and/or apparatuses may be integrated or separated. In addition, the operation of the systems and apparatuses disclosed herein may be performed by more, fewer, or other components and the methods described may include more, fewer, or other steps. Additionally, unless otherwise specified steps may be performed in any suitable order.

Although specific advantages have been enumerated above, various embodiments may include some, none, or all of the enumerated advantages.

What is claimed is:

1. A computer-implemented method for determining agricultural tillage management practices for use within a current growing year, the computer-implemented method comprising:
   retrieving a first set of records from a historical cropland data layer database, wherein the first set of records corresponds to randomly sampled areas of a first geographic region taken over a first time period for a first number of years;
   retrieving a second set of records from a historical imagery database, wherein the second set of records corresponds to the randomly sampled areas of the first geographic region, the first time period, and the first number of years;
   employing the second set of records as inputs to train a first deep learning convolutional neural network to generate the first set of records and using parameters generated during training to configure a trained first deep learning convolutional neural network for execution;
   configuring a second deep learning convolutional neural network using parameters corresponding to early layers of the trained first deep learning convolutional neural network;
   retrieving a third set of records and a fourth set of records from an annotated imagery database, wherein the third set of records comprises unannotated image versions corresponding to a second geographic region, and wherein the fourth set of records comprises annotated image versions corresponding to the second geographic region, and wherein the annotated image versions comprise annotations indicative of management zones, and wherein the third and fourth sets of records correspond to a second time period for a second number of years;
   employing the third set of records as inputs to train upper layers of the second deep learning convolutional neural network to generate the fourth set of records and using parameters generated during training to configure a trained second deep learning convolutional neural network for execution;
   retrieving a fifth set of records from a current imagery database, wherein the fifth set of records comprises corresponds to a third geographic region, and wherein the fifth set of records corresponds to the second time period and the current growing year;
   using the fifth set of records as inputs and executing the trained second deep learning convolutional neural network to generate predicted agricultural management zones for the current growing year; and
   aggregating the fifth set of record into residue indices for parcels within the third geographic region, and processing the residue indices over the second time period for the current growing year to infer tillage practices for each of the predicted agricultural management zones as demarcated by boundaries of each of the parcels.

2. The computer-implemented method as recited in claim 1, wherein the trained first deep learning convolutional neural network and the trained second deep learning convolutional neural network each comprise 5 layers.

3. The computer-implemented method as recited in claim 2, wherein the second deep learning convolutional neural network uses parameters corresponding to early layers of the trained first deep learning convolutional neural network.

4. The computer-implemented method as recited in claim 1, wherein each of the second, third, fourth, and fifth sets of records each comprise 128×128 pixel images.

5. The computer-implemented method as recited in claim 4, wherein the each of the 128×128 pixel images comprise Sentinel satellite red channel, blue channel, green channel, near infrared channel, and cloud mask channel.

6. The computer-implemented method as recited in claim 4, wherein the prescribed time period comprises May through October, and wherein the number of 128×128 pixel images for each of the second number of years comprises 60 images.

7. The computer-implemented method as recited in claim 1, wherein the second number of years comprises three 2 years previous to the current growing year.

8. A non-transitory computer-readable storage medium storing instructions that, when executed by a computer, cause the computer to perform a method for determining agricultural tillage management practices for use within a current growing year, the method comprising:
   retrieving a first set of records from a historical cropland data layer database, wherein the first set of records corresponds to randomly sampled areas of a first geographic region taken over a first time period for a first number of years;
   retrieving a second set of records from a historical imagery database, wherein the second set of records corresponds to the randomly sampled areas of the first geographic region, the first time period, and the first number of years;
   employing the second set of records as inputs to train a first deep learning convolutional neural network to generate the first set of records and using parameters generated during training to configure a trained first deep learning convolutional neural network for execution;
   configuring a second deep learning convolutional neural network using parameters corresponding to early layers of the trained first deep learning convolutional neural network;
   retrieving a third set of records and a fourth set of records from an annotated imagery database, wherein the third set of records comprises unannotated image versions corresponding to a second geographic region, and wherein the fourth set of records comprises annotated image versions corresponding to the second geographic region, and wherein the annotated image versions comprise annotations indicative of management zones, and wherein the third and fourth sets of records correspond to a second time period for a second number of years;
   employing the third set of records as inputs to train upper layers of the second deep learning convolutional neural network to generate the fourth set of records and using parameters generated during training to configure a trained second deep learning convolutional neural network for execution;

retrieving a fifth set of records from a current imagery database, wherein the fifth set of records comprises corresponds to a third geographic region, and wherein the fifth set of records corresponds to the second time period and the current growing year;

using the fifth set of records as inputs and executing the trained second deep learning convolutional neural network to generate predicted agricultural management zones for the current growing year; and aggregating the fifth set of record into residue indices for parcels within the third geographic region, and processing the residue indices over the second time period for the current growing year to infer tillage practices for each of the predicted agricultural management zones as demarcated by boundaries of each of the parcels.

9. The non-transitory computer-readable storage medium as recited in claim 8, wherein the trained first deep learning convolutional neural network and the trained second deep learning convolutional neural network each comprise 5 layers.

10. The non-transitory computer-readable storage medium as recited in claim 9, wherein the second deep learning convolutional neural network uses parameters corresponding to early layers of the trained first deep learning convolutional neural network.

11. The non-transitory computer-readable storage medium as recited in claim 8, wherein each of the second, third, fourth, and fifth sets of records each comprise 128× 128 pixel images.

12. The non-transitory computer-readable storage medium as recited in claim 11, wherein the each of the 128×128 pixel images comprise Sentinel satellite red channel, blue channel, green channel, near infrared channel, and cloud mask channel.

13. The non-transitory computer-readable storage medium as recited in claim 11, wherein the prescribed time period comprises May through October, and wherein the number of 128×128 pixel images for each of the second number of years comprises 60 images.

14. The non-transitory computer-readable storage medium as recited in claim 8, wherein the second number of years comprises three 2 years previous to the current growing year.

15. A computer program product for determining agricultural tillage management practices for use within a current growing year, the computer program product comprising:

a non-transitory computer-readable medium having computer-readable program code stored thereon, the computer-readable program code comprising:

program instructions to retrieve a first set of records from a historical cropland data layer database, wherein the first set of records corresponds to randomly sampled areas of a first geographic region taken over a first time period for a first number of years;

program instructions to retrieve a second set of records from a historical imagery database, wherein the second set of records corresponds to the randomly sampled areas of the first geographic region, the first time period, and the first number of years;

program instructions to employ the second set of records as inputs to train a first deep learning convolutional neural network to generate the first set of records and to use parameters generated during training to configure a trained first deep learning convolutional neural network for execution;

program instructions to configure a second deep learning convolutional neural network using parameters corresponding to early layers of the trained first deep learning convolutional neural network;

program instructions to retrieve a third set of records and a fourth set of records from an annotated imagery database, wherein the third set of records comprises unannotated image versions corresponding to a second geographic region, and wherein the fourth set of records comprises annotated image versions corresponding to the second geographic region, and wherein the annotated image versions comprise annotations indicative of management zones, and wherein the third and fourth sets of records correspond to a second time period for a second number of years;

program instructions to employ the third set of records as inputs to train upper layers of the second deep learning convolutional neural network to generate the fourth set of records and to use parameters generated during training to configure a trained second deep learning convolutional neural network for execution;

program instructions to use the fifth set of records as inputs and to execute the trained second deep learning convolutional neural network to generate predicted agricultural management zones for the current growing year; and program instructions to aggregate the fifth set of record into residue indices for parcels within the third geographic region, and processing the residue indices over the second time period for the current growing year to infer tillage practices for each of the predicted agricultural management zones as demarcated by boundaries of each of the parcels.

16. The computer program product as recited in claim 15, wherein the trained first deep learning convolutional neural network and the trained second deep learning convolutional neural network each comprise 5 layers.

17. The computer program product as recited in claim 16, wherein the second deep learning convolutional neural network uses parameters corresponding to early layers of the trained first deep learning convolutional neural network.

18. The computer program product as recited in claim 15, wherein each of the second, third, fourth, and fifth sets of records each comprise 128×128 pixel images.

19. The computer program product as recited in claim 18, wherein the prescribed time period comprises May through October, and wherein the number of 128×128 pixel images for each of the second number of years comprises 60 images.

20. The computer program product as recited in claim 15, wherein the second number of years comprises three 2 years previous to the current growing year.

* * * * *